United States Patent
Daugherty, III

(10) Patent No.: US 10,425,361 B2
(45) Date of Patent: Sep. 24, 2019

(54) DYNAMIC ALLOCATION OF TERMINATION RESISTORS IN A COMMUNICATION NETWORK

(71) Applicant: Trane International Inc., Davidson, NC (US)

(72) Inventor: William David Daugherty, III, Gladewater, TX (US)

(73) Assignee: Trane International Inc., Davidson, NC (US)

(*) Notice: Subject to any disclaimer, the term of this patent is extended or adjusted under 35 U.S.C. 154(b) by 75 days.

(21) Appl. No.: 15/461,155

(22) Filed: Mar. 16, 2017

(65) Prior Publication Data
US 2018/0270169 A1    Sep. 20, 2018

(51) Int. Cl.
| | |
|---|---|
| *H04L 12/939* | (2013.01) |
| *H04L 12/28* | (2006.01) |
| *H04L 12/931* | (2013.01) |
| *H04L 12/40* | (2006.01) |

(52) U.S. Cl.
CPC ........ *H04L 49/555* (2013.01); *H04L 12/2823* (2013.01); *H04L 49/205* (2013.01); *H04L 2012/40215* (2013.01)

(58) Field of Classification Search
CPC .. H04L 12/2823; H04L 49/205; H04L 49/555
See application file for complete search history.

(56) References Cited

U.S. PATENT DOCUMENTS

| | | |
|---|---|---|
| 4,748,426 A | 5/1988 | Stewart |
| 4,792,920 A | 12/1988 | Ogawa |
| 5,029,284 A | 7/1991 | Feldbaumer et al. |
| 5,166,561 A | 11/1992 | Okura |
| 5,208,562 A | 5/1993 | Schirm, IV |
| 5,272,396 A | 12/1993 | Mammano et al. |
| 5,313,105 A | 5/1994 | Samela et al. |
| 5,338,979 A | 8/1994 | Mammano et al. |
| 5,382,841 A | 1/1995 | Feldbaumer |
| 5,394,121 A | 2/1995 | Cipolla et al. |
| 5,422,580 A | 6/1995 | Mandel et al. |
| 5,442,305 A | 8/1995 | Martin et al. |
| 5,513,373 A | 4/1996 | Damkier |
| 5,521,528 A | 5/1996 | Mammano et al. |
| 5,523,704 A | 6/1996 | So |
| 5,528,167 A | 6/1996 | Samela et al. |

(Continued)

OTHER PUBLICATIONS

STIC NPL search, Apr. 30, 2019 (Year: 2019).*

(Continued)

*Primary Examiner* — Benjamin H Elliott, IV
(74) *Attorney, Agent, or Firm* — The Salerno Law Firm, P.C.

(57) ABSTRACT

Methods and apparatus for improving network performance include automatically setting the activation state of a termination resistor of a network device. A network communications error rate and, optionally, the identity of the network nodes associated with the errors, is determined. The error rate is compared to threshold criteria. If the error rate exceeds a predetermined threshold, the activation state of the termination resistor is toggled. If no improvement to the error rate is detected, the termination resistor is reverted to its original activation state.

21 Claims, 5 Drawing Sheets

(56) References Cited

U.S. PATENT DOCUMENTS

| | | |
|---|---|---|
| 5,534,792 A | 7/1996 | Lillis et al. |
| 5,553,250 A | 9/1996 | Miyagawa et al. |
| 5,570,037 A | 10/1996 | Llorens |
| 5,576,640 A | 11/1996 | Emnett et al. |
| 5,583,448 A | 12/1996 | Corder et al. |
| 5,585,741 A | 12/1996 | Jordan |
| 5,635,852 A | 6/1997 | Wallace |
| 5,705,937 A | 1/1998 | Yap |
| 5,726,582 A | 3/1998 | Hedberg |
| 5,802,390 A | 9/1998 | Kashiwagi et al. |
| 5,834,949 A | 11/1998 | Oba |
| 5,841,995 A | 11/1998 | Ogawa |
| 5,919,252 A | 7/1999 | Klein |
| 5,959,489 A | 9/1999 | Walck |
| 5,983,296 A | 11/1999 | Lamkin et al. |
| 6,029,216 A | 2/2000 | Hoglund et al. |
| 6,040,714 A | 3/2000 | Klein |
| 6,051,989 A | 4/2000 | Walck |
| 6,061,806 A | 5/2000 | Caldwell et al. |
| 6,070,206 A | 5/2000 | Lohmeyer et al. |
| 6,070,211 A | 5/2000 | Neal et al. |
| RE36,789 E | 7/2000 | Mandel et al. |
| 6,092,131 A | 7/2000 | Caldwell et al. |
| 6,148,351 A | 11/2000 | Takase |
| 6,154,047 A | 11/2000 | Taguchi |
| 6,188,271 B1 | 2/2001 | Wang et al. |
| 6,259,269 B1 | 7/2001 | Hui |
| 6,262,591 B1 | 7/2001 | Hui |
| 6,281,702 B1 | 8/2001 | Hui |
| 6,310,490 B1 | 10/2001 | Hui |
| 6,335,632 B1 | 1/2002 | Hui |
| 6,351,136 B1 | 2/2002 | Jones et al. |
| 6,351,138 B1 | 2/2002 | Wong |
| 6,356,103 B1 | 3/2002 | Hui |
| 6,356,104 B1 | 3/2002 | Hui |
| 6,359,464 B1 | 3/2002 | Hui |
| 6,359,465 B1 | 3/2002 | Hui |
| 6,373,276 B1 | 4/2002 | Hui |
| 6,400,178 B1 | 6/2002 | Hui |
| 6,420,897 B1 | 7/2002 | Hui |
| 6,425,025 B1 | 7/2002 | Kamepalli |
| 6,426,813 B1 * | 7/2002 | Swenson ............ G01R 31/001 324/627 |
| 6,429,678 B1 | 8/2002 | Wong et al. |
| 6,480,030 B1 | 11/2002 | Taguchi |
| 6,686,763 B1 | 2/2004 | Yen |
| 6,754,132 B2 | 6/2004 | Kyung |
| 6,823,020 B1 | 11/2004 | Fendt et al. |
| 6,862,249 B2 | 3/2005 | Kyung |
| 6,937,111 B2 | 8/2005 | Kwon |
| 7,616,473 B2 | 11/2009 | Kyung |
| 7,786,752 B2 | 8/2010 | Oh et al. |
| 7,787,283 B2 | 8/2010 | Kyung |
| RE44,618 E | 12/2013 | Kyung |
| 8,890,637 B2 | 11/2014 | El-Sayed |
| 2003/0099138 A1 | 5/2003 | Kyung |
| 2003/0124989 A1 | 7/2003 | Kwon |
| 2004/0032319 A1 | 2/2004 | Kyung |
| 2004/0179420 A1 | 9/2004 | Kyung |
| 2005/0044275 A1 * | 2/2005 | Adamson ............ H04L 41/00 709/253 |
| 2007/0147106 A1 | 6/2007 | Kyung |
| 2008/0159026 A1 | 7/2008 | Oh et al. |
| 2008/0186870 A1 * | 8/2008 | Butts ................ H04L 41/0659 370/252 |
| 2009/0184858 A1 * | 7/2009 | Kiwimagi ............ G08C 19/00 341/176 |
| 2009/0252045 A1 * | 10/2009 | Noguchi ............ H04B 3/546 370/249 |
| 2010/0013516 A1 | 1/2010 | Kyung |
| 2012/0112848 A1 * | 5/2012 | El-Sayed ............ H04L 25/0298 333/17.3 |
| 2015/0163945 A1 * | 6/2015 | Barton ............ F24F 11/006 361/809 |
| 2015/0258999 A1 * | 9/2015 | Jiang ............ B60W 50/029 701/29.2 |
| 2015/0347258 A1 * | 12/2015 | Du ............ G06F 11/3027 714/4.2 |
| 2016/0227422 A1 * | 8/2016 | Partheniou ............ H04L 43/0817 |
| 2016/0330044 A1 * | 11/2016 | Andrews ............ H04L 12/4013 |
| 2017/0086281 A1 * | 3/2017 | Avrahamy ............ C02F 1/42 |
| 2017/0131611 A1 * | 5/2017 | Brown ............ G02F 1/163 |
| 2017/0286351 A1 * | 10/2017 | Williams ............ H04L 12/40 |
| 2018/0195448 A1 * | 7/2018 | Eastman ............ F02D 17/02 |

OTHER PUBLICATIONS

NXP Semiconductors N.V., TJA1042 High-Speed CAN transceiver with Standby Mode product data sheet, Rev. 9, May 23, 2016.

Toshiba Corporation, TLP175A Photorelay product data sheet, Rev. 2.0, May 26, 2014.

* cited by examiner

DYNAMIC ALLOCATION OF TERMINATION RESISTORS IN A COMMUNICATION NETWORK

BACKGROUND

1. Technical Field

The present disclosure relates generally to building automation system (BAS) control networks, and more particularly, to BAS devices which dynamically allocate termination resistors in BAS communications networks.

2. Background of Related Art

A building automation system (BAS) is used to coordinate, manage, and automate control of diverse environmental, physical, and electrical building devices and systems, particularly heating, ventilation, and air conditioning (HVAC) systems. Other building systems such as lighting, security, and environment management systems may also be controlled and monitored by a BAS. A BAS includes a BAS controller that can use hardwired and/or wireless communications networks using open and/or proprietary protocols to link various endpoint BAS devices, such as variable air volume (VAV) boxes, chiller plants, rooftop units, variable refrigerant flow (VRF) systems, blowers, convectors, user interface devices, and/or sensors, to provide system-wide user access, monitoring, and control. Many wired BAS installations communicate using the TIA/EIA RS-485 standard to implement the controller area network (CANbus) network protocol introduced by Robert Bosch GmbH of Gerlingen, Germany.

RS-485 provides a differential balanced line twisted pair physical layer. Typical RS-485 network devices used in BAS installations employ a termination resistor to impedance-match the signal lines at the network connection. Termination of RS-485 connections is required to minimize electrical reflections in the network which would otherwise degrade network performance. Typically, an installer will set a dual inline package (DIP) switch located on a printed circuit board (PCB) of the BAS device to enable or disable the termination resistor during the initial system configuration process. In other instances, header pin jumpers may be used to select termination resistor status, traces cut or resoldered, or a termination resistor may be physically inserted or removed from the PCB as needed. However, there is no defined procedure that installers and technicians follow to determine when or where to enable or disable the termination resistor. Usually a combination of experience, luck, and trial & error will determine which termination resistors are needed in a BAS installation. In large and complex environments, this is a tedious and time-consuming task that can lead to a "good enough" solution that falls short of achieving optimal network performance.

In addition, modern PCB designs now use miniaturized surface mount devices (SMD) to save space and reduce the cost of PCB fabrication. Since a DIP switch is a relatively large device compared to an SMD, designs which employ DIP switches require more PCB space, have an expanded form factor, and cost more to produce. Another drawback of DIP switches in a BAS device is that they can be easily misconfigured, and can experience electrical or mechanical failures that degrade network performance in a manner that can be extremely difficult to troubleshoot.

SUMMARY

In one embodiment of the present disclosure, a method for setting a termination resistor by a network device is described. The method includes determining a network communications error rate, and toggling the activation status of the termination resistor if the network communications error rate exceeds a predetermined threshold.

In some embodiments, the method includes determining a post-toggling network communications error rate; and reverting the activation status of the termination resistor if the post-toggling network communications error rate is not less than the network communications error rate. In some embodiments, the method includes waiting a random amount of time before performing the toggling. The random amount of time may be within a range of about one second to about one minute. In some embodiments, determining a network communications error rate include evaluating a weighted aggregate of a plurality of error detection methods. The plurality of error detection methods may include one or more of bit monitoring, bit stuffing, frame checking, acknowledgement check, and/or cyclic redundancy check.

In another embodiment of the present disclosure, a method for setting a termination resistor by a master network device is described. The method includes determining a network communications error rate, determining whether the network communications error rate is associated with the master network device, toggling the activation status of the termination resistor of the master network device if the network communications error rate is associated with the master network device, identifying a slave network device having the greatest network communications error rate, and toggling the activation status of the termination resistor of the slave network device if the network communications error rate is not associated with the master network device.

In some embodiments, the method includes determining a post-toggling network communications error rate associated with the network device having the toggled termination resistor, and reverting the activation status of the toggled termination resistor if the post-toggling network communications error rate of the network device having the toggled termination resistor is not less than the prior network communications error rate. In some embodiments, the method includes waiting a random amount of time before performing the toggling. The random amount of time may be within a range of about one second to about one minute. In some embodiments, determining a network communications error rate includes evaluating a weighted aggregate of a plurality of error detection methods. The plurality of error detection methods may include one or more of bit monitoring, bit stuffing, frame checking, acknowledgement check, and/or cyclic redundancy check.

In yet another embodiment of the present disclosure, an improvement to a building automation system (BAS) device is described. The BAS device is configured for CANbus communication over a balanced twisted pair network bus having a switchable termination resistor. The improved BAS device includes a termination resistor controller that evaluates a CANbus communication error rate and generates a resistor control signal in response thereto. The improved BAS device includes an electronic switch communicatively coupled to the termination resistor controller and the termination resistor. The electronic switch is arranged to selectively activate or deactivate the termination resistor across the network bus in response to the resistor control signal.

In some embodiments, the electronic switch includes first and second switched terminals, a control input, an optically triggered solid state switch disposed between the first and second switched terminals, a light source optically coupled to the optically triggered solid state switch, and an electrically triggered solid state switch configured to activate the light source in response to the control input. In some embodiments, the optically triggered solid state switch is a photo MOSFET. In some embodiments, the electrically triggered solid state switch is a transistor.

In some embodiments, the termination resistor controller causes the activation state of the termination resistor to toggle if the CANbus communication error rate exceeds a predetermined threshold. In some embodiments, the termination resistor controller causes the activation state of the termination resistor to revert its pre-toggled state if the post-toggle CANbus communication error rate is not less than the pre-toggle CANbus communication error rate.

In some embodiments, the termination resistor controller is configured for operative communication with a second termination resistor controller of a second BAS device. The resistor controller causes the activation state of a termination resistor of the second BAS device to toggle if the CANbus communication error rate of the second BAS device exceeds a predetermined threshold. The termination resistor controller causes the activation state of the termination resistor of the second BAS device to revert its pre-toggled state if the post-toggle CANbus communication error rate of the second BAS device is not less than the pre-toggle CANbus communication error rate of the second BAS device.

BRIEF DESCRIPTION OF THE DRAWINGS

Various embodiments of the disclosed system and method are described herein with reference to the drawings wherein.

Figure 1:
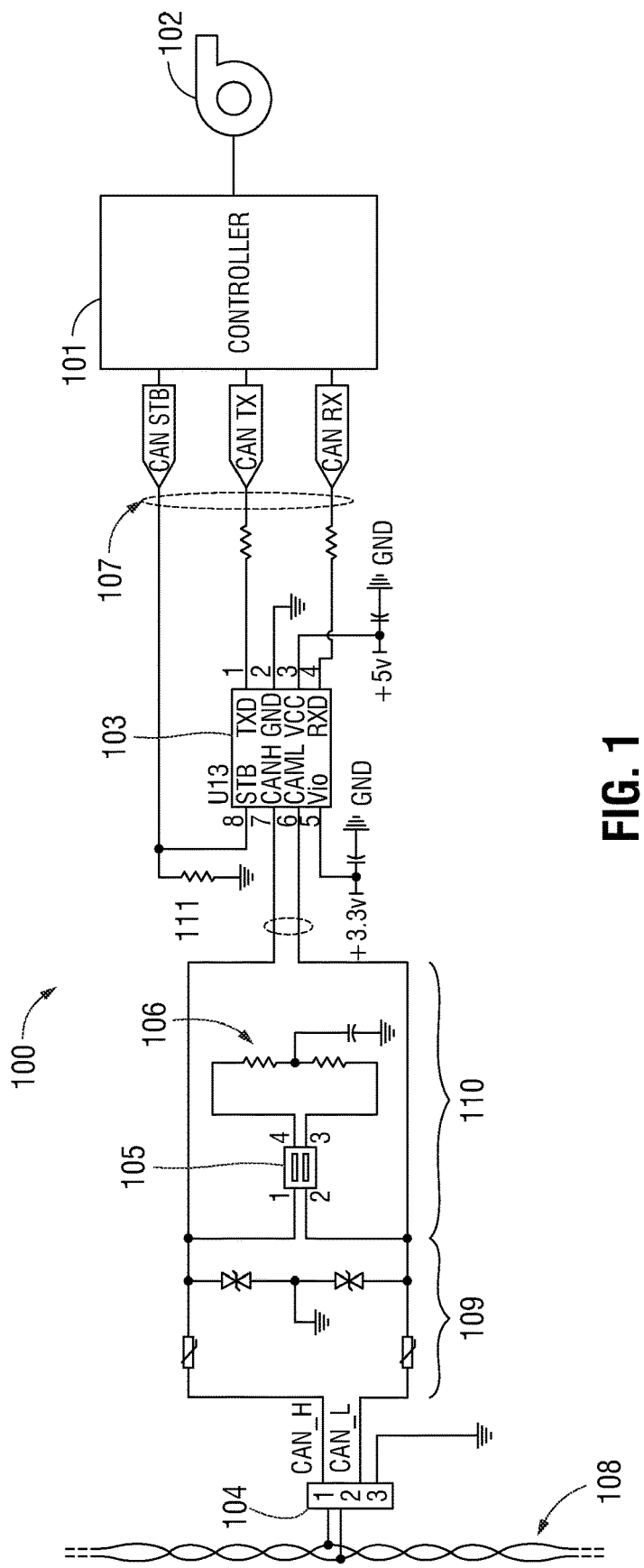
FIG. 1 is a schematic diagram of an RS-485 transceiver which uses a prior art termination resistor control method.

The various aspects of the present disclosure mentioned above are described in further detail with reference to the aforementioned figures and the following detailed description of exemplary embodiments.

DETAILED DESCRIPTION

The systems and methods disclosed herein may be advantageously employed in building automation systems such as those disclosed in U.S. Pat. No. 8,050,801, filed Aug. 22, 2005, issued Nov. 1, 2011, and entitled "Dynamically Extensible and Automatically Configurable Building Automation System and Architecture"; U.S. patent application Ser. No. 8,099,178, filed Dec. 22, 2005, issued Jan. 17, 2012, and entitled "Building Automation System Facilitating User Customization"; U.S. Pat. No. 7,904,186, filed Dec. 22, 2005, issued Mar. 8, 2011, and entitled "Building Automation System Facilitating User Customization"; U.S. Pat. No. 8,024,054, filed Dec. 22, 2005, issued Sep. 20, 2011, and entitled "Building Automation System Facilitating User Customization"; U.S. Pat. No. 7,870,090, filed Dec. 22, 2005, issued Jan. 11, 2011, and entitled "Building Automation System Data Management"; U.S. Pat. No. 8,055,386, filed Dec. 22, 2005, issued Nov. 8, 2011, and entitled "Building Automation System Data Management"; U.S. Pat. No. 8,055,387, filed Dec. 22, 2005, issued Nov. 8, 2011, and entitled "Building Automation System Data Management"; U.S. Pat. No. 7,917,232, filed Dec. 22, 2005, issued Mar. 29, 2011, and entitled "Building Automation System Data Management"; and U.S. Pat. No. 8,290,627, filed Dec. 22, 2005, issued Oct. 16, 2012, and entitled "Dynamically Extensible and Automatically Configurable Building Automation System and Architecture," all of which are assigned to the applicant of the present disclosure, and are incorporated by reference herein for all purposes.

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and examples for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. One skilled in the art will also appreciate that, for security reasons, any element of the present disclosure may include any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

FIG. 1 illustrates a prior art RS-485 transceiver 100 typically found in conventional BAS devices. Prior art transceiver 100 includes a device controller 101 which includes a processor, memory, interface circuitry, and operating software to monitor and control the operation of an HVAC device 102. HVAC device 102 can be any HVAC device, such as a BAS controller, VAV box, sensor, user interface device, and so forth. In order to send and receive communications from the BAS, device controller 101 is communicatively coupled via controller signal lines 107 to CANbus interface 103 that provides an interface between device controller 101 and CANbus signal lines 111. A protection circuit 109 interposed between CANbus signal lines 111 and CANbus network 108 includes overcurrent and overvoltage limiting devices such as fuses, positive temperature coefficient (PTC) thermistors, Zener diodes and the like to protect RS-485 transceiver 100 from damaging voltage surges, current surges, spikes etc. which may occur on CANbus network 108. The twisted pair wiring which forms the physical layer of the CANbus network 108 is electrically coupled to prior art RS-485 transceiver 100 via connector 104 which can be a terminal block or any other suitable electrical connector. Prior art RS-485 transceiver 100 includes a conventional termination resistor circuit 110 having one or more termination resistors 106 that are connected or disconnected from CANbus signal lines 111 using a set of DIP switches 105.

Figure 2:
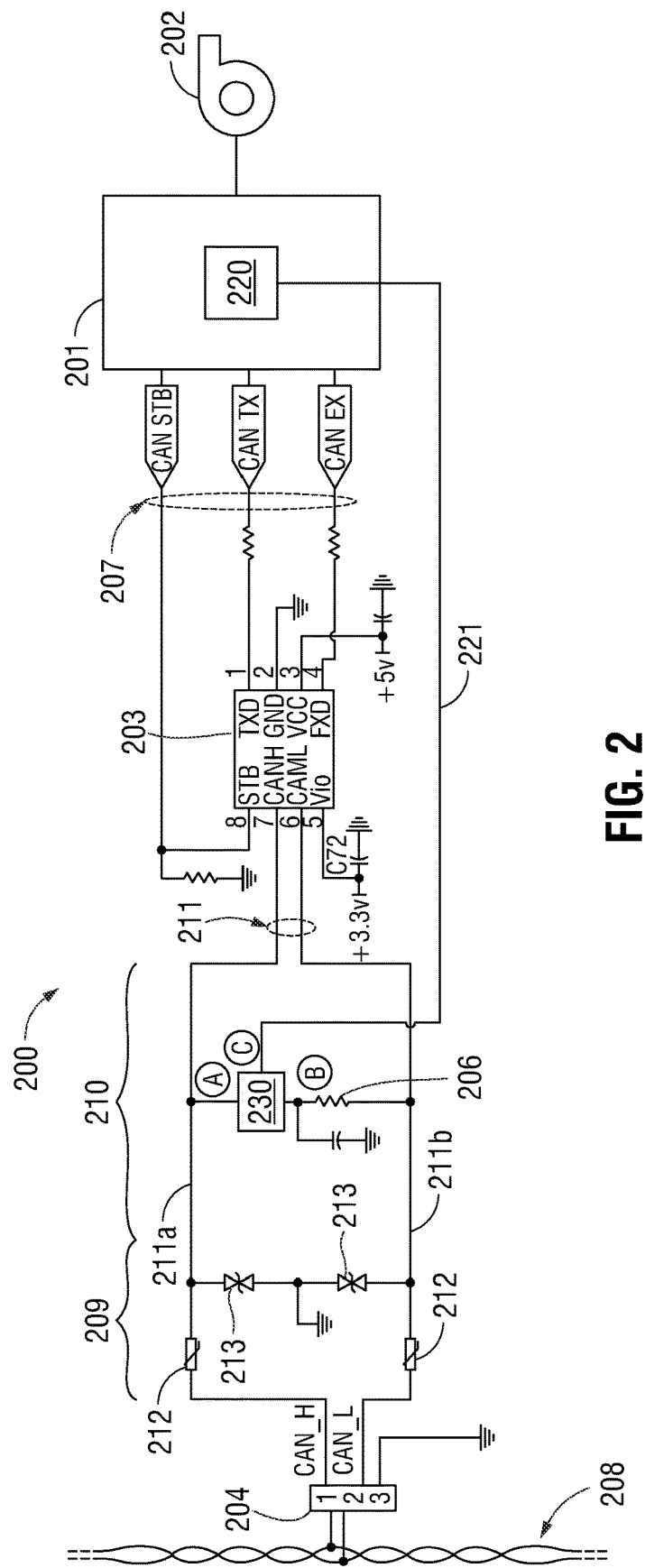
FIG. 2 is a schematic diagram of an RS-485 transceiver which employs an embodiment of a termination resistor control method in accordance with the present disclosure.

Turning now to FIG. 2, an exemplary embodiment of an RS-485 transceiver 200 in accordance with the present disclosure is illustrated. RS-485 transceiver 200 includes a device controller 201 which includes a processor, memory, interface circuitry, and operating software to monitor and control the operation of HVAC device 202. Device controller 201 is communicatively coupled via controller signal lines 207 to CANbus interface 203 which provides an interface between device controller 201 and CANbus signal lines 211 to communicate BAS data between network media 208 and device controller 201 using the CANbus protocol. CANbus interface 203 may be an integrated circuit (IC) such as a "TJA1042 High-Speed CAN Transceiver with Standby Mode" manufactured by NXP Semiconductors N.V. of Eindhoven, The Netherlands. CANbus signal lines 211 include CAN high line 211a and CAN low line 211b in a balanced pair configuration. Protection circuit 209 is interposed between CANbus signal lines 211 and CANbus network 208 and includes overcurrent limiting devices 212 and overvoltage limiting devices 213 to protect RS-485 transceiver 200 from harmful electrical transients which may occur on CANbus network 208. In the present exemplary embodiment, overcurrent limiting device 212 are a pair of positive temperature coefficient (PTC) thermistors coupled in series, respectively, on each leg of CANbus signal lines 211 between CANbus network 208 and CANbus interface 203. Overcurrent limiting device 212 may additionally or alternatively include a fuse, fusible link, circuit breaker, or other suitable current protection circuit. Overvoltage limiting device 212 is a Zener diode configured to shunt CANbus signal line 211 to ground during an overvoltage condition. In some embodiments, overvoltage limiting device 212 may additionally or alternatively include a metal oxide varistor (MOV) or other suitable voltage protection circuit. A connector 204, such as a terminal block or other electrical connector couples RS-485 transceiver 200 to CANbus network 208.

RS-485 transceiver 200 includes a termination resistor controller 220 that is operatively associated with device controller 201 and a termination resistor circuit 210 having a termination resistor 206 that is switched in or out of circuit under the control of termination resistor controller 220. Termination resistor 206 is selectively coupled to the CAN bus, e.g., between CAN high line 211a and CAN low line 211b, via electronic switch 230. Electronic switch 230 is switched on or off in accordance with a resistor control signal received from termination resistor controller 220 via resistor control circuit 221. In the present embodiment, termination resistor 206 has a value of 60Ω, however, the present invention is not so limited and therefore termination resistor 206 may have any desired value.

Figure 3:
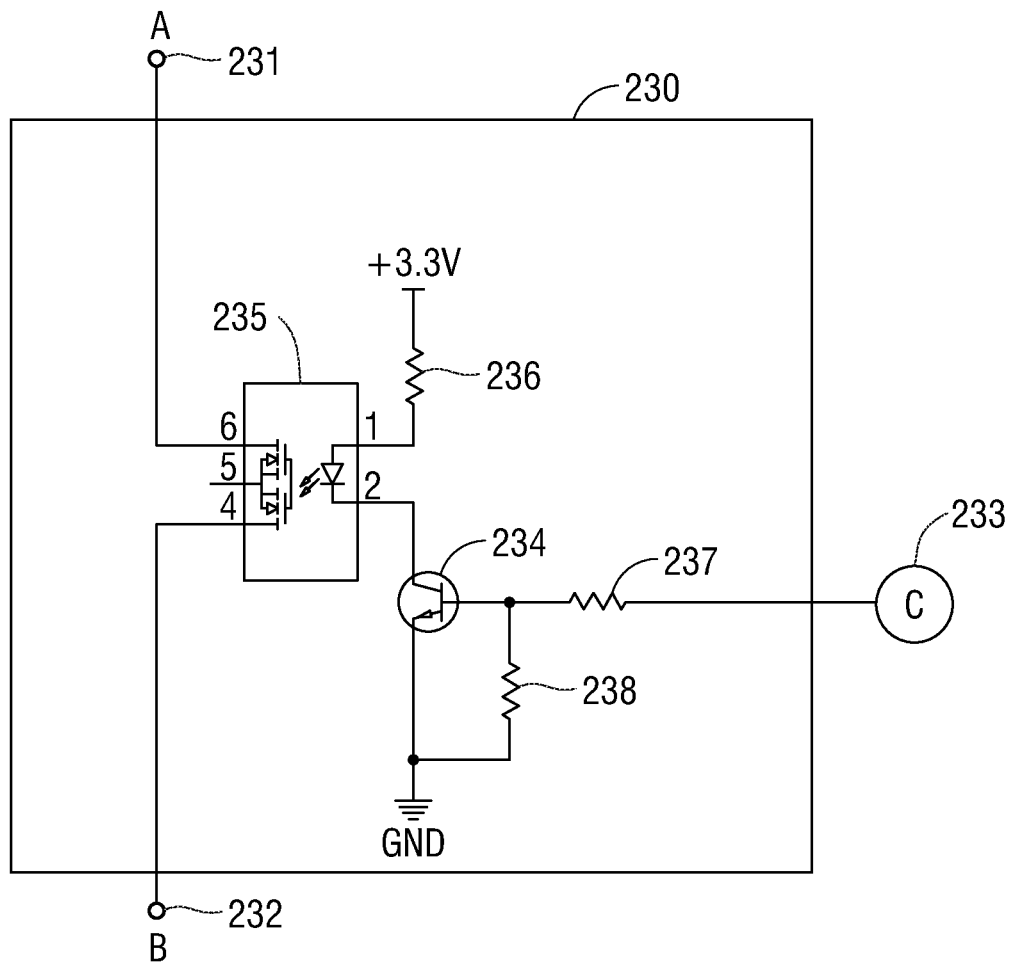
FIG. 3 is a schematic diagram of an electronic switch in accordance with an embodiment of the present invention.

FIG. 3 illustrates in more detail an electronic switch 230 in accordance with an exemplary embodiment of the present disclosure. Electronic switch 230 includes a pair of switched terminals 231 and 232 and a control input 233. When control input 233 is activated, switched terminals 231 and 232 are connected which couples termination resistor 206 to the network bus, e.g., between CAN high line 211a and CAN low line 211b. Conversely, when control input 233 is deactivated, switched terminals 231 and 232 open, removing termination resistor 206 from the circuit.

In more detail, control input 233 is coupled to a pair of biasing resistors 237 and 238 that are coupled to the base terminal of NPN transistor 234. NPN transistor 234 is configured such that when control input 233 is high (e.g., +3.3V), NPN transistor 234 conducts (e.g., switched "on") between its collector and emitter terminals. Conversely, when control input 233 is low (e.g., 0V or ground), NPN transistor 234 does not conduct (e.g., switched "off"). Electronic switch 230 includes a photorelay 235 and a current-limiting resistor 236. A suitable photorelay 235 is a TLP175A photorelay sold by Toshiba America Electronic Components, Inc. of Irvine, Calif., USA. A light-emitting diode incorporated with photorelay 235 is coupled in series between a voltage source (+3.3V) and the collector of NPN transistor 234 such that when NPN transistor 234 is switched on, a photo MOSFET device included within photorelay 235 switches on to provide a low resistance path, essentially a short circuit, between switched lines 231 and 232. Advantageously, the use of an optoisolated switch with termination resistor 206 significantly reduces or eliminates degradation of the RS-485 networking signal which might otherwise occur due to undesirable interactions between automatically-switched termination resistor 206 and other active or passive components of the disclosed device.

In the present example embodiment of electronic switch 230 depicted in FIG. 3, a high-level resistor control signal received at control input 233 inserts termination resistor 206 into the network interface, and a low-level resistor control signal removes termination resistor 206 from the network interface. However, the disclosed invention is not so limited, and may operate in the opposite sense wherein a low-level resistor control signal received at control input 233 inserts termination resistor 206 into the network interface, and a high-level resistor control signal removes termination resistor 206 from the network interface. Electronic switch 230 may, in embodiments, employ other switching configurations such as those which utilize PNP transistors, electromechanical relays and/or other types of solid state relays.

Referring again to FIG. 2, termination resistor controller 220 is communicatively coupled with device controller 201. Device controller 201 receives and transmits BAS data between network media 208 and device controller 201 using the CANbus protocol where messages are communicated in discrete packets, or frames.

In a first operating mode referred to as master-slave mode, device controller 201 conveys to termination resistor controller 220 information relating communication errors detected by device controller 201, in addition to the identity of a specific remote CANbus node with which device controller 201 was attempting to communicate when the aforesaid error(s) were detected. Termination resistor controller 220 evaluates the communication error information relating to the identified remote node, and determines whether to toggle the state of a termination resistor in the remote node. If so, termination resistor controller 220 causes a message to be sent to the identified remote node commanding that node to toggle the state of its termination resistor. After the remote termination resistor is toggled, termination resistor controller 220 re-evaluates the communication errors between the CANbus nodes to determine the proper setting of the remote termination resistor 206. If the error rate has decreased, the new setting of the remote termination resistor is retained, otherwise, it is reverted back to the previous setting.

In a second operating mode referred to as standalone mode, information relating to communication errors detected by device controller 201 is conveyed to termination resistor controller 220. Termination resistor controller 220 evaluates the communication error information and determines whether to toggle the state of termination resistor 206. After termination resistor 206 is toggled, termination resistor controller 220 re-evaluates the communication errors, if any, to determine the proper setting of termination resistor 206, e.g., whether any improvement resulted from the new setting and whether to leave the new setting, or revert to the original setting.

As mentioned above, termination resistor controller 220 may be embodied in a software form, for example, as a module within a CANbus networking stack included in device controller 201. In embodiments, termination resistor controller 220 may be embodied in a hardware form, for example, a programmable logic device (PLD), and/or may be embodied in a hybrid form consisting of software and hardware.

Information relating to communications error may include an error rate, e.g., the number of frames transmitted successfully compared to the number of frames transmitted in total. Various error detection techniques suitable for use with the CANbus protocol may be used to determine whether a frame was transmitted successfully or unsuccessfully, such as bit monitoring, bit stuffing, frame check, acknowledgement, and/or cyclic redundancy check (CRC). In bit monitoring, device controller 201 monitors the transmitted signal level. If the transmitted level of a bit differs from the one transmitted, a bit monitoring error is said to have occurred. In bit stuffing, after five consecutive bits of the same level are transmitted, a sixth bit of the opposite level is inserted into the transmitted bit stream. The receiving node will strip out this extra bit, but, if more than five consecutive bits of the same level occurs on the bus, a bit stuff error is said to have occurred. In frame check, if an invalid value is detected in a fixed field of a CANbus message, a frame check error is said to have occurred. In acknowledgement check, all nodes on the bus that correctly receive a message are expected to send an acknowledgement message. If the transmitting node does not received the expected acknowledgement message(s), an acknowledgement error is said to have occurred. In CRC, each message includes a 15-bit cyclic redundancy checksum (CRC). A receiving node calculates a CRC of the received message which is compared to the CRC contained in the message. If the calculated CRC does not match the received CRC, a CRC error is said to have occurred.

Any one, some, or all of the above or other error detection techniques now or in the future known may be employed in any desired combination to determine whether a termination resistor should be toggled. In some embodiments, error rates indicated by each error detection method may be weighted and/or may use different error rate thresholds in determining whether an aggregate error rate is acceptable, or not, and therefore whether to toggle a termination resistor.

Figure 4:
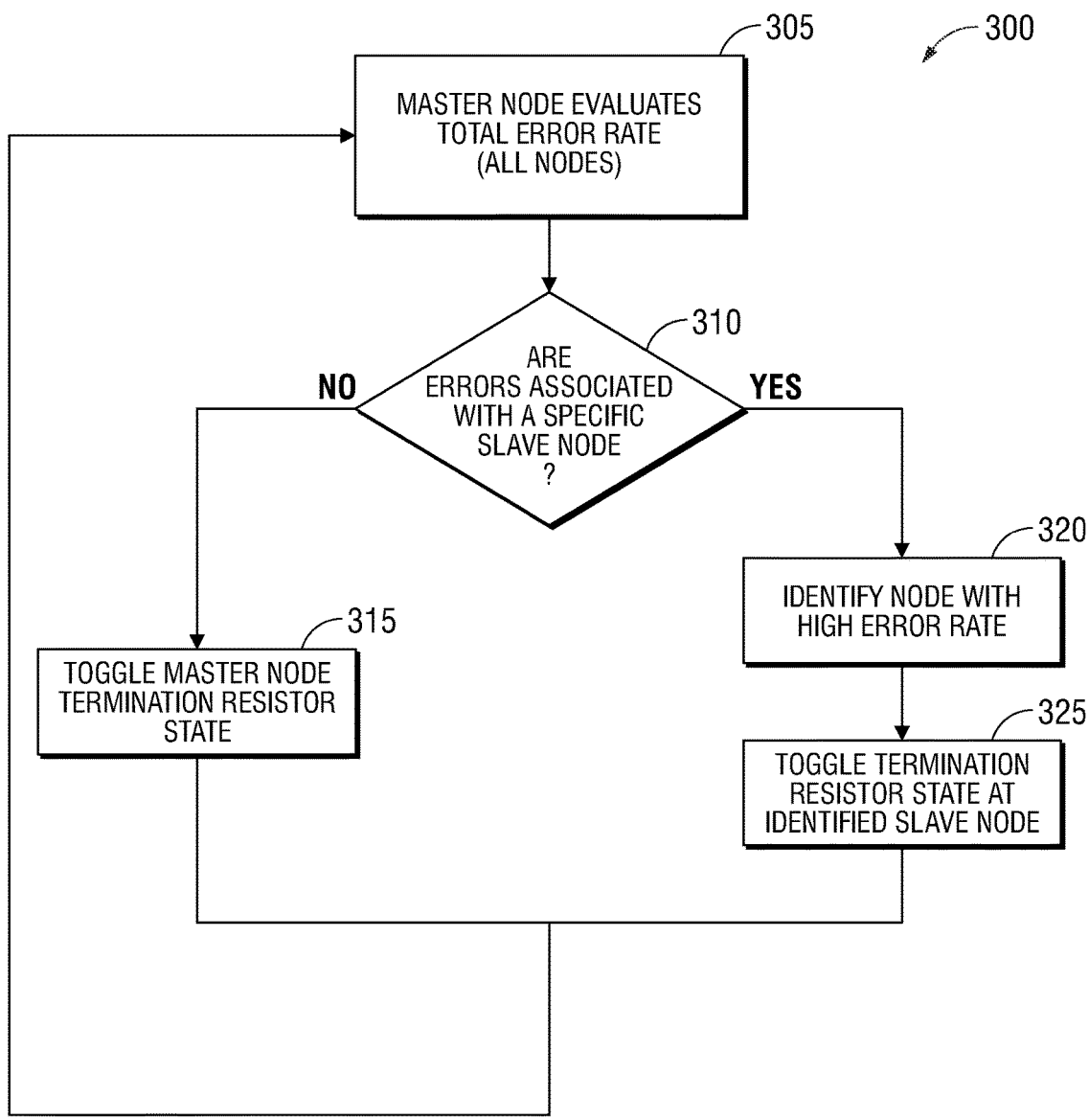
FIG. 4 illustrates an embodiment of a termination resistor control method in accordance with the present disclosure.

Turning now to FIG. 4, a flowchart depicting a master-slave operating mode 300 in accordance with an embodiment of the present disclosure is shown. In the step 305, a master CANbus node evaluates an overall error rate of the CANbus network. That is, errors identified while communicating with any one, some or all node members of the network may be considered. In the step 310, errors that are associated with a specific node (e.g., a so-called slave node) are identified. If no such nodes are identified it is assumed the source of the error(s) is the master node, therefore in the step 315, the activation state of the termination resistor of the master node is toggled. Otherwise, in the step 320, the slave node with the highest error rate is identified. In the step 325, the activation state of the high-error termination node identified in the step 320 is toggled. The method iterates to the step 305 and error evaluation continues.

Figure 5:
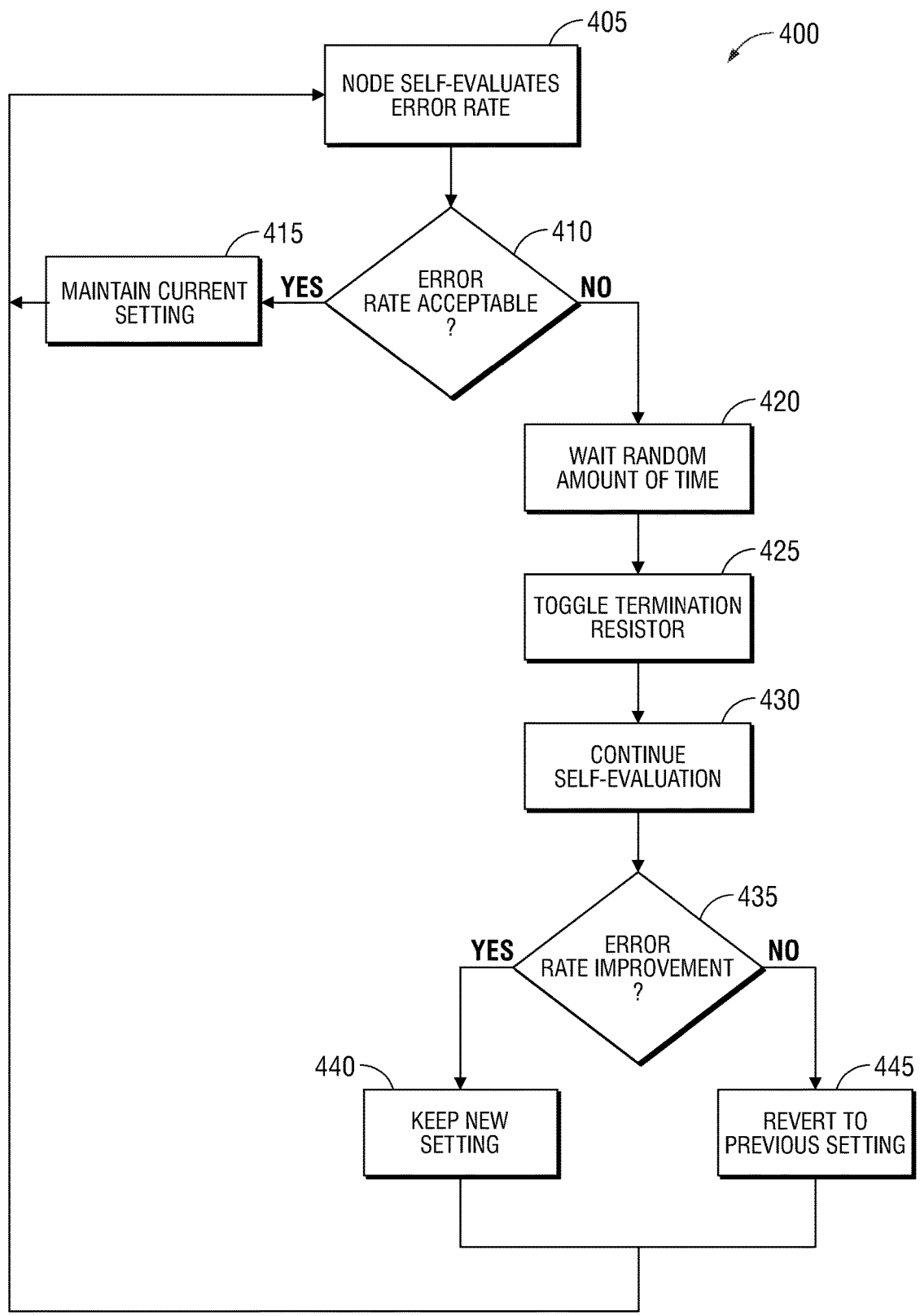
FIG. 5 illustrates another embodiment of a termination resistor control method in accordance with the present disclosure.

FIG. 5 is a flowchart depicting a standalone operating mode 400 of an embodiment of the present disclosure. In the step 405, the node self-evaluates its own error rate. If the error rate is within acceptable limits (e.g., below a predetermined error threshold) then in the step 415 the current setting for the termination resistor is maintained, and the process iterates to the step 405 to continue error rate monitoring. Conversely, if in the step 410 the error rate is found to be unacceptable, then in the step 420 the process pauses for duration of time selected at random. In embodiments, the random amount of time may be in the range of about one second to about one minute. One purpose of performing a random wait at this point is to reduce the likelihood of multiple nodes attempting to evaluate an error condition at the same time, which could cause false results. At the expiration of the random wait time, the activation state of the self-evaluating node is toggled, and in the step 430 the node continues self-evaluation. In the step 435, a determination is made as to whether any improvement in network error rate (e.g., decreased error rate) has occurred post-toggling. If the post-toggling error rate has improved, the new termination resistor setting is retained in the step 440 and the process iterates to the step 405. Conversely, if no improvement in error rate is seen, or the error rate worsens, in the step 445 the activation state of the termination resistor is reverted to its previous (pre-toggling) setting.

Aspects

It is noted that any of aspects 1-21 may be combined with each other in any suitable combination.

Aspect 1. A method for setting a termination resistor by a network device, comprising determining a network communications error rate; and toggling the activation status of the termination resistor if the network communications error rate exceeds a predetermined threshold.

Aspect 2. The method in accordance with aspect 1, further comprising determining a post-toggling network communications error rate; and reverting the activation status of the termination resistor if the post-toggling network communications error rate is not less than the network communications error rate.

Aspect 3. The method in accordance with aspect 1 or 2, further comprising waiting a random amount of time before performing the toggling.

Aspect 4. The method in accordance with any of aspects 1-3, wherein the random amount of time is within a range of about one second to about one minute.

Aspect 5. The method in accordance with any of aspects 1-4, wherein determining a network communications error rate comprises evaluating a weighted aggregate of a plurality of error detection methods.

Aspect 6. The method on accordance with any of aspects 1-5, wherein the plurality of error detection methods includes one or more of bit monitoring, bit stuffing, frame checking, acknowledgement check, and/or cyclic redundancy check.

Aspect 7. A method for setting a termination resistor by a master network device, comprising determining a network communications error rate; determining whether the network communications error rate is associated with the master network device; toggling the activation status of the termination resistor of the master network device if the network communications error rate is associated with the master network device; identifying a slave network device having the greatest network communications error rate and toggling the activation status of the termination resistor of the slave network device if the network communications error rate is not associated with the master network device.

Aspect 8. The method in accordance with aspect 7, further comprising determining a post-toggling network communications error rate associated with the network device having the toggled termination resistor; and reverting the activation status of the toggled termination resistor if the post-toggling network communications error rate of the network device having the toggled termination resistor is not less than the prior network communications error rate.

Aspect 9. The method in accordance with aspect 7 or 8, further comprising waiting a random amount of time before performing the toggling.

Aspect 10. The method in accordance with any of aspects 7-9, wherein the random amount of time is within a range of about one second to about one minute.

Aspect 11. The method in accordance with any of aspects 7-10, wherein determining a network communications error rate comprises a weighted aggregate of a plurality of error detection methods.

Aspect 12. The method on accordance with any of aspects 7-11, wherein the plurality of error detection methods includes one or more of bit monitoring, bit stuffing, frame checking, acknowledgement check, and/or cyclic redundancy check.

Aspect 13. In a building automation system (BAS) device configured for CANbus communication over a balanced twisted pair network bus and having a switchable termination resistor, an improvement comprising a termination resistor controller that evaluates a CANbus communication error rate and generates a resistor control signal in response thereto; and an electronic switch communicatively coupled to the termination resistor controller and configured to selectively activate or deactivate the termination resistor across the network bus in response to the resistor control signal.

Aspect 14. The BAS device in accordance with aspect 13, wherein the electronic switch comprises first and second switched terminals; a control input; an optically triggered solid state switch disposed between the first and second switched terminals; a light source optically coupled to the optically triggered solid state switch; and an electrically triggered solid state switch configured to activate the light source in response to the control input.

Aspect 15. The BAS device in accordance with aspect 13 or 14, wherein the optically triggered solid state switch is a photo MOSFET.

Aspect 16. The BAS device in accordance with any of aspects 13-15, wherein the electrically triggered solid state switch is a transistor.

Aspect 17. The BAS device in accordance with any of aspects 13-16, wherein the termination resistor controller causes the activation state of the termination resistor to toggle if the CANbus communication error rate exceeds a predetermined threshold.

Aspect 18. The BAS device in accordance with any of aspects 13-17, wherein the termination resistor controller causes the activation state of the termination resistor to revert its pre-toggled state if the post-toggle CANbus communication error rate is not less than the pre-toggle CANbus communication error rate.

Aspect 19. The BAS device in accordance with any of aspects 13-18, wherein the termination resistor controller is configured for operative communication with a second termination resistor controller of a second BAS device.

Aspect 20. The BAS device in accordance with any of aspects 13-19, wherein the resistor controller causes the activation state of a termination resistor of the second BAS device to toggle if the CANbus communication error rate of the second BAS device exceeds a predetermined threshold.

Aspect 21. The BAS device in accordance with any of aspects 13-20, wherein the termination resistor controller causes the activation state of the termination resistor of the second BAS device to revert its pre-toggled state if the post-toggle CANbus communication error rate of the second BAS device is not less than the pre-toggle CANbus communication error rate of the second BAS device.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method for setting a termination resistor by a network device connected to a communications bus, comprising:
   providing a termination resistor toggleable between a first activation state wherein the termination resistor is operatively coupled to the communications bus, and a second activation state wherein the termination resistor is operatively uncoupled from the communications bus;
   determining whether a network communications error rate exceeds a predetermined threshold;
   responding to a determination that the network communications error rate exceeds a predetermined threshold by toggling the activation state of the termination resistor.

2. The method in accordance with claim 1, further comprising:
   determining a post-toggling network communications error rate; and
   reverting the activation state of the termination resistor if the post-toggling network communications error rate is not less than the network communications error rate.

3. The method in accordance with claim 1, further comprising waiting a random amount of time before performing the toggling.

4. The method in accordance with claim 3, wherein the random amount of time is within a range of about one second to about one minute.

5. The method in accordance with claim 1, wherein determining a network communications error rate comprises a weighted aggregate of a plurality of error detection methods.

6. The method on accordance with claim 5, wherein the plurality of error detection methods includes one or more of bit monitoring, bit stuffing, frame checking, acknowledgement check, and/or cyclic redundancy check.

7. A method for setting a termination resistor by a master network device connected at least one slave network device by a communications bus, comprising:
   providing, at the master network device, a termination resistor toggleable between a first activation state wherein the termination resistor is operatively coupled to the communications bus, and a second activation state wherein the termination resistor is operatively uncoupled from the communications bus;
   providing, at the at least one slave network device, a termination resistor toggleable between a first activation state wherein the termination resistor is operatively coupled to the communications bus, and a second activation state wherein the termination resistor is operatively uncoupled from the communications bus;
   determining a network communications error rate;
   determining whether the network communications error rate is associated with the master network device;
   toggling the activation state of the termination resistor of the master network device if the network communications error rate is associated with the master network device;
   identifying a slave network device having the greatest network communications error rate and toggling the activation state of the termination resistor of the slave network device if the network communications error rate is not associated with the master network device.

8. The method in accordance with claim 7, further comprising:
   determining a post-toggling network communications error rate associated with the network device having the toggled termination resistor; and
   reverting the activation state of the toggled termination resistor if the post-toggling network communications error rate of the network device having the toggled termination resistor is not less than the prior network communications error rate.

9. The method in accordance with claim 7, further comprising waiting a random amount of time before performing the toggling.

10. The method in accordance with claim 9, wherein the random amount of time is within a range of about one second to about one minute.

11. The method in accordance with claim 7, wherein determining a network communications error rate comprises evaluating a weighted aggregate of a plurality of error detection methods.

12. The method on accordance with claim 11, wherein the plurality of error detection methods includes one or more of bit monitoring, bit stuffing, frame checking, acknowledgement check, and/or cyclic redundancy check.

13. A building automation system (BAS) device configured for controller area network (CANbus) communication over a balanced twisted pair network bus and having a switchable termination resistor, comprising:
   a termination resistor controller that evaluates a CANbus communication error rate and generates a resistor control signal in response thereto; and
   an electronic switch communicatively coupled to the termination resistor controller and configured to selectively couple or uncouple the termination resistor to the network bus in response to the resistor control signal.

14. The BAS device in accordance with claim 13, wherein the electronic switch comprises:
   first and second switched terminals;
   a control input;
   an optically triggered solid state switch disposed between the first and second switched terminals;
   a light source optically coupled to the optically triggered solid state switch; and
   an electrically triggered solid state switch configured to activate the light source in response to the control input.

15. The BAS device in accordance with claim 14, wherein the optically triggered solid state switch is a photo MOSFET.

16. The BAS device in accordance with claim 14, wherein the electrically triggered solid state switch is a transistor.

17. The BAS device in accordance with claim 13, wherein the termination resistor controller causes the activation state of the termination resistor to toggle if the CANbus communication error rate exceeds a predetermined threshold.

18. The BAS device in accordance with claim 17, wherein the termination resistor controller causes the activation state of the termination resistor to revert its pre-toggled state if the post-toggle CANbus communication error rate is not less than the pre-toggle CANbus communication error rate.

19. The BAS device in accordance with claim 13, wherein the termination resistor controller is configured for operative communication with a second termination resistor controller of a second BAS device.

20. The BAS device in accordance with claim 19, wherein the resistor controller causes the activation state of a termination resistor of the second BAS device to toggle if the CANbus communication error rate of the second BAS device exceeds a predetermined threshold.

21. The BAS device in accordance with claim 20, wherein the termination resistor controller causes the activation state of the termination resistor of the second BAS device to revert its pre-toggled state if the post-toggle CANbus communication error rate of the second BAS device is not less than the pre-toggle CANbus communication error rate of the second BAS device.

* * * * *